Nov. 8, 1949     A. V. BEDFORD     2,487,511

CONTOUR INDICATING DEVICE

Filed May 21, 1947     3 Sheets-Sheet 1

INVENTOR
ALDA V. BEDFORD
BY
ATTORNEY

Nov. 8, 1949     A. V. BEDFORD     2,487,511

CONTOUR INDICATING DEVICE

Filed May 21, 1947     3 Sheets-Sheet 2

INVENTOR
ALDA V. BEDFORD
BY
ATTORNEY

Nov. 8, 1949 — A. V. BEDFORD — 2,487,511
CONTOUR INDICATING DEVICE
Filed May 21, 1947 — 3 Sheets-Sheet 3
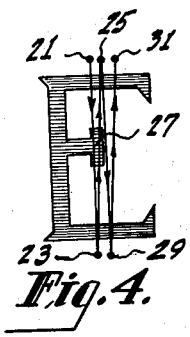
Fig. 4.
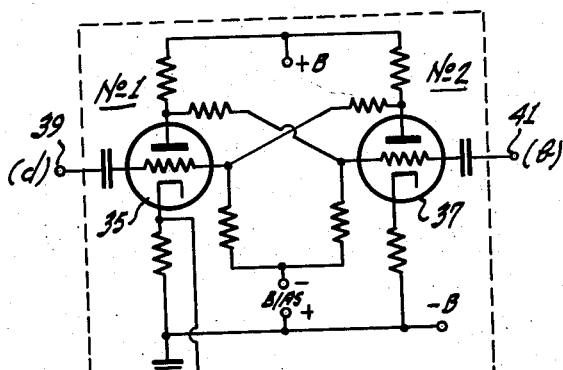
Fig. 5. MULTIVIBRATOR
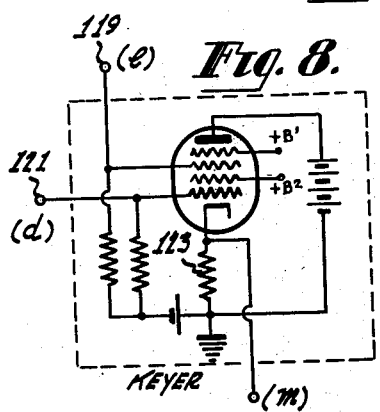
Fig. 8. KEYER
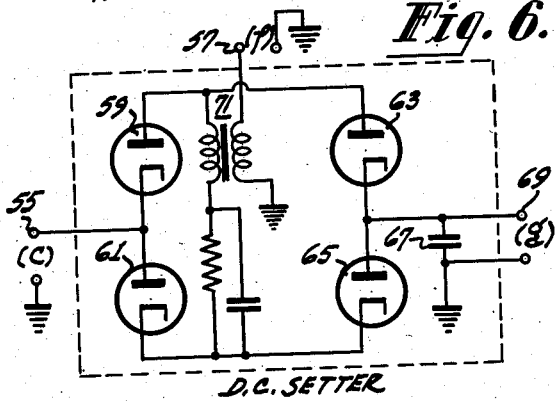
Fig. 6. D.C. SETTER
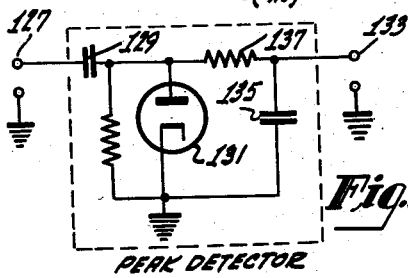
Fig. 9. PEAK DETECTOR
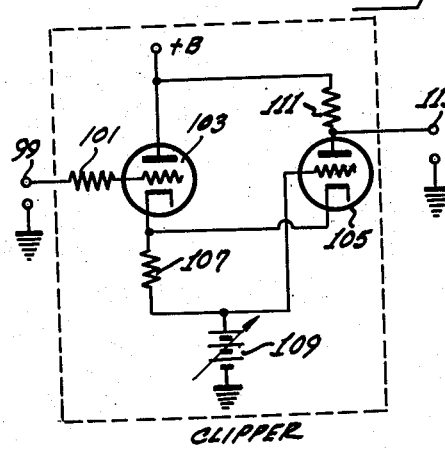
Fig. 7. CLIPPER
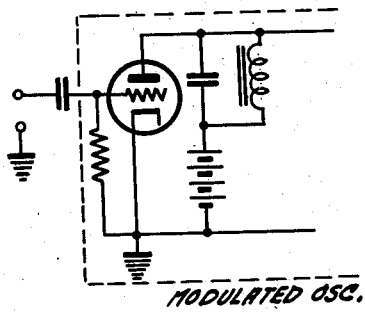
Fig. 10. MODULATED OSC.
INVENTOR.
ALDA V. BEDFORD
BY
ATTORNEY Patented Nov. 8, 1949

2,487,511

UNITED STATES PATENT OFFICE 2,487,511

CONTOUR INDICATING DEVICE

Alda V. Bedford, Princeton, N. J., assignor to Radio Corporation of America, a corporation of Delaware Application May 21, 1947, Serial No. 749,569

11 Claims. (Cl. 35—35)

This invention relates to apparatus for the production of an electrical signal corresponding to the contour of an indicium, and particularly to such a device in which an electrical current is produced whose amplitude or frequency varies in accordance with the contour of a predetermined curve or area.

In its broader aspect the invention has utility in various fields of application. For example, in electronic computing systems are known wherein a cathode ray is normally deflected to a reference point near one corner of a target provided with secondary-electron-emissive curves arranged in accordance with a particular function of two variables, $x$ and $y$. The ray is deflected along the $x$ rectangular coordinate a distance determined by a voltage of an amplitude proportional to a selected value of $x$. The ray is then deflected along the perpendicular $y$ coordinate a distance determined by a voltage of an amplitude proportional to a selected value of $y$, and crosses a number of secondary-emissive lines formed on the target, the number crossed at any position on the $x$ coordinate being determined by the configuration of the lines in accordance with the predetermined function. As each line is crossed a pulse is produced which operates a counter whereby a representation of the value of the function $f(x,y)$ is established. (See U. S. Patent 2,412,467, issued December 10, 1946, to George A. Morton.)

One disadvantage of such a system is that the function curves on the target are necessarily enclosed within the cathode ray tube and thus cannot be changed. Furthermore, it is sometimes desirable to produce an output voltage whose amplitude or frequency is proportional to the desired function, rather than a number of pulses.

The present invention utilizes a beam of light, instead of a cathode ray, which scans a target of paper, or other similar material, on which may be drawn or printed a curve representing the particular function $y=f(x)$, in rectangular coordinates. By means of a conventional vibrating mirror the light beam is caused to sweep cyclically across the curve in a direction parallel to the $y$ coordinate. Its position along the $x$ coordinate may be manually adjusted to a position corresponding to a given value of the variable $x$, or deflected electrically by a second mirror, to the desired position on the $x$ coordinate. The present invention then provides means for producing a D. C. voltage whose amplitude or an alternating voltage whose frequency is proportional to the distance from the $x$ coordinate to the curve, and thus is indicative of the value of $y$ in the equation $y=f(x)$.

It will be observed, therefore, that the present invention provides means for producing an electrical signal corresponding in amplitude or frequency to the contour of a line, or any similar indicium, as a spot of light oscillating in a direction parallel to the $y$ coordinate is moved along the $x$ coordinate.

This invention also has utility as a reading aid for the blind, and a preferred embodiment of the invention having particular utility for such a purpose will be described in detail. When applied to the solution of this problem, the indicia scanned by the light beam will be the printed characters, letters or numerals, of a text, unique identification of their outline being accomplished by vibrating the spot, produced by a beam of light, parallel to the $y$ axis, that is, transversely across the line of characters, at a relatively rapid rate while moving the spot more slowly along the line (the $x$ coordinate) to produce an audible tone. The frequency of the tone is indicative of the distance from the $x$ axis, which may be considered as an imaginary reference axis above or below the line of characters, to the edge of the character at the point in question. The varying frequency produced as the line is "read" permits a visual picture to be formed indicative of the shape or contour of the top or bottom of the individual characters. To provide a more positive identification, the top and bottom contours may be reproduced simultaneously in terms of two separate and distinct tones varying simultaneously in frequency.

The upper and lower contours of a few characters may be substantially identical. For their positive identification there is provided means for producing a third tone of constant frequency the presence of which indicates that a portion of the character lies in an area near the horizontal center line of the characters. This will permit the identification of such letters as "o," "e" and "c" for example.

It is, therefore, the primary object of this invention to provide means for producing an electrical signal whose frequency or amplitude corresponds to the contour of an indicium such as a line, letter, numeral or distinctive area.

It is a further object of this invention to provide means for scanning a given area containing information-representing indicia and for producing a signal whose amplitude or frequency varies in accordance with the contour of said indicia.

A still further object of this invention is to provide an improved reading aid for the blind.

A still further object is to provide means for producing an audible tone representative of the contour or outline of a line of characters.

A further object is to provide means for producing an audible tone which varies in frequency in accordance with the contour or outline of a line of characters.

A still further object is to identify characters having similar outline by means of audible tones.

The novel features that are considered characteristic of this invention are set forth with particularity in the appended claims. The invention both as to its organization and method of operation, as well as additional objects and advantages thereof, will best be understood from the following description when read in connection with the accompanying drawings, in which Figure 1 is a diagrammatic drawing, partly in block diagram form, of an embodiment of this invention;

Figure 4 is an enlarged view of the scanning path followed by the light spot during two successive cycles across the letter "E";

Figure 5 is the circuit diagram of a multivibrator which may be used in connection with the invention;

Figure 6 is the circuit diagram of a D. C. setter;

Figure 7 is the circuit diagram of a clipper;

Figure 8 is the circuit diagram of a keyer; and

Figure 9 is the circuit diagram of a peak detector.

Figure 1:
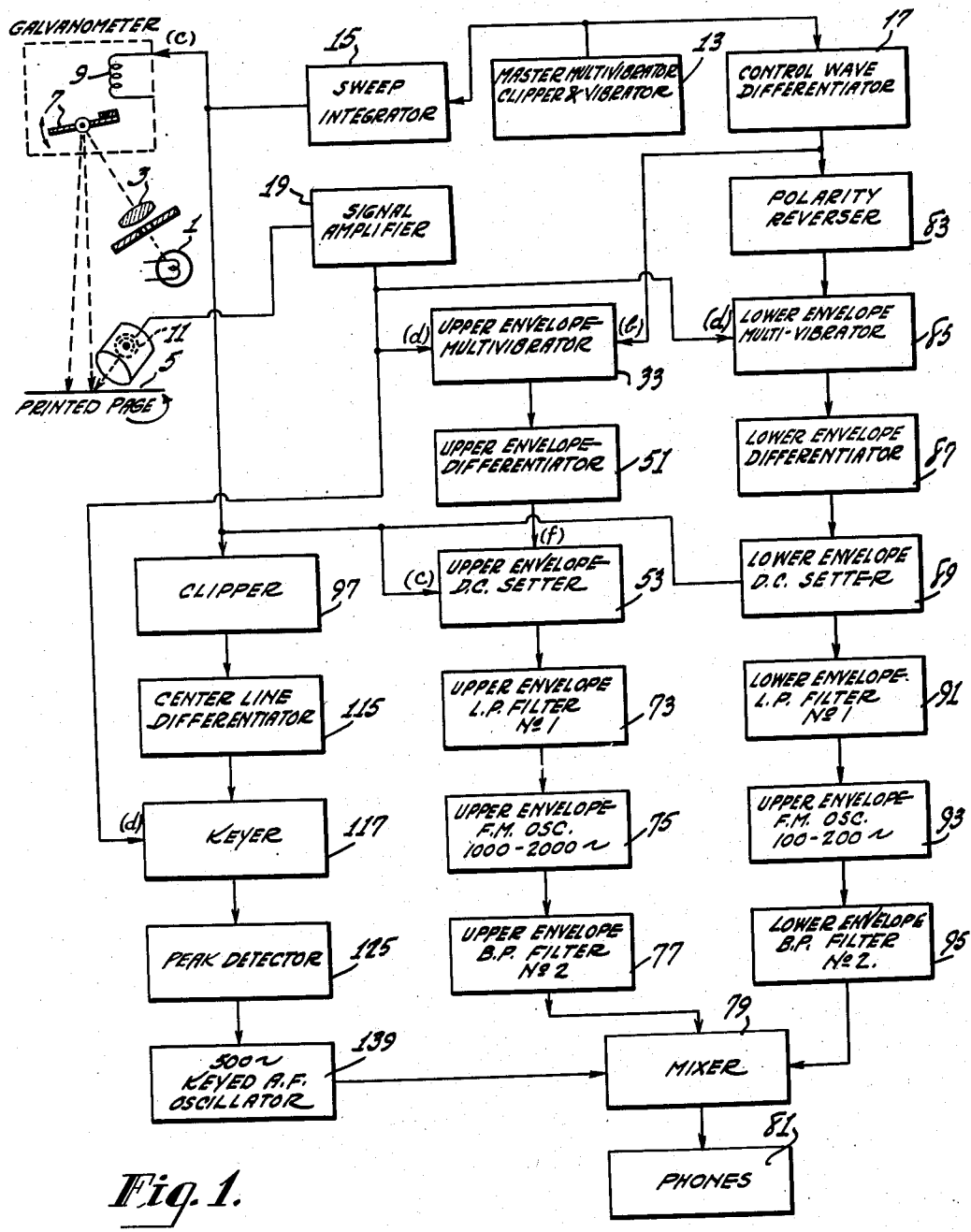

Referring to Fig. 1, the apparatus for scanning the printed line with a spot of light is diagrammatically illustrated, since this portion of the apparatus is conventional. The probe or scanner may take the form illustrated in a copending application of Zworykin et al., Serial No. 560,472, filed October 26, 1944, now Patent No. 2,451,014. A source of light 1 is focussed by a lens 3 on the printed pape 5 which contains the line of characters to be "read," illustrated in greater detail in Fig. 3, by way of a mirror 7 mounted for rotational movement about a horizontal axis, in response to the energizing current flowing in coil 9. The light reflected from the page is picked up by a phototube 11. In the view shown in Fig. 1 the vibration of the mirror causes the small spot of light to sweep transversely across the printed line, which is assumed to extend in a direction perpendicular to the drawings.

The electrical components for the apparatus are shown in block diagram form. Those elements which are conventional and well known in the art have not been illustrated in detail, but those which may not be well known, or which require specific description of their mode of operation or method of connection will be illustrated in detail in subsequent figures of the drawing.

A master multivibrator clipper and amplifier device 13 provides the primary synchronizing voltage which controls the operation of the elements of a combination. This is simply a well known device of the type which produces a cyclic square wave output voltage of the type illustrated in curve a of Fig. 2. The square wave voltage from the master multivibrator 13 is applied to the input of a sweep integrator 15 which converts the square wave voltage into a symmetrical sawtooth voltage of the type illustrated in curve c of Fig. 2. The output of the sweep integrator 15 is applied to the energizing coil 9 which causes the linear reciprocal vibration of the mirror 7.

Figure 2:
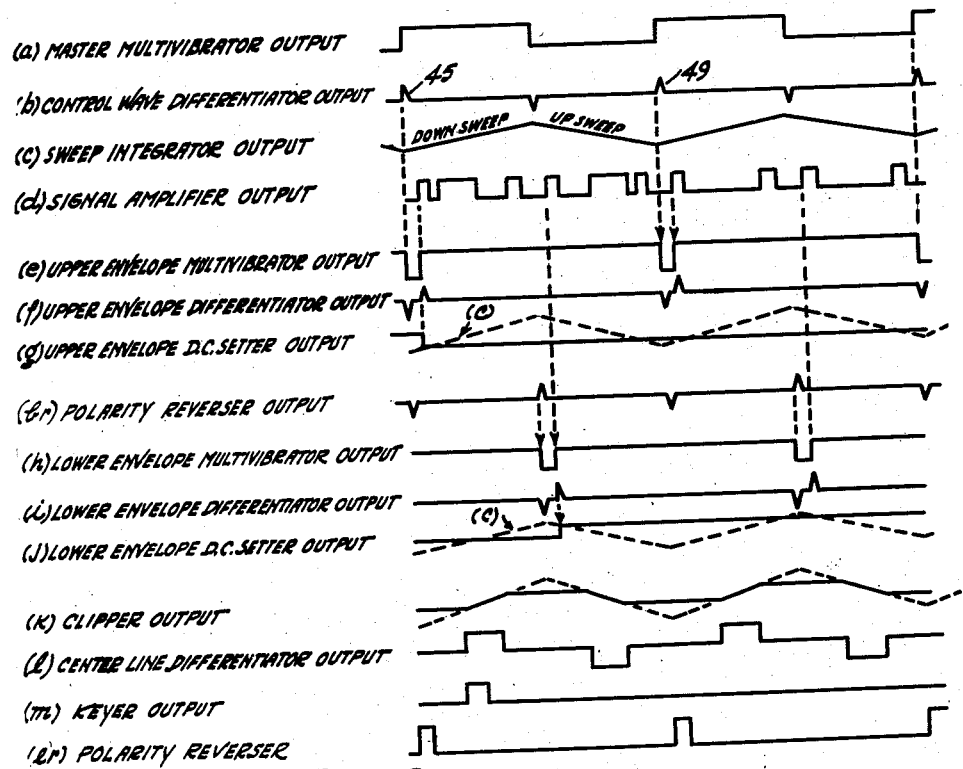
Figure 2 is a set of curves illustrating the operation of the device illustrated in Fig. 1.

The square wave voltage produced by the master multivibrator 13 is also applied to the input of a control wave differentiator 17 which produces an output voltage of the type shown in curve b of Fig. 2. The output of the photoelectric tube 11 is applied to the input of a signal amplifier 19, which amplifies the voltage produced by the phototube and produces a signal voltage which is characteristic of the black surface of the printed characters along the line traversed by the spot of light during any cycle of operation.

For the purpose of illustration two complete cycles have been shown in the curves of Fig. 2 based on the assumption that the probe is scanning the letter E, as shown in Fig. 4. It is assumed that for the period in question, the light spot starts at point 21, moves transversely across the letter to point 23 and returns to point 25 in the first cycle of operation. It will be noted that during this period the probe has been advanced along the line a short distance. It is further assumed that during the first cycle the spot crosses the top and bottom of the letter as well as the central portion 27. It is further assumed that during the second cycle of operation the spot moves from point 25 to point 29 and back to point 31, but that it has now moved to the right a sufficient distance so that the spot does not strike the central portion 27 of the letter.

The potential of the output voltage produced by signal amplifier 19 is so controlled that a positive output potential corresponds to "black" and zero potential corresponds to "white." Thus it may be observed that the irregular square wave voltage of curve d in Fig. 2 represents the output voltage of the signal amplifier 19 during the two cycles of operation described in connection with Fig. 4.

An upper envelope multivibrator 33 is a device having two stable conditions of operation and may be, for example, of the type illustrated in Fig. 5. This device includes two tubes 35 and 37 which are interconnected in such a manner that when one tube is conducting it biases off the other tube, and the condition can only be reversed by applying a positive pulse to the grid of the other tube. This pulse then causes the other tube to conduct and it in turn biases off the first tube. Two input terminals 39 and 41 are therefore provided, output being taken across the cathode resistor of tube 35 and is available at output terminal 43.

The signal voltage d is applied to input terminal 39 while the differentiated voltage produced by control wave differentiator 17 is applied to input terminal 41. Assuming that prior to the arrival of the first positive pulse 45 (Fig. 2) of the differentiated wave b that tube 35 was conducting, the pulse 45 will cause tube 37 to conduct and tube 35 will be cut off. Simultaneously the spot will begin to move from point 21 to point 23 (Fig. 4). Consequently, the output voltage (curve e) will drop to ground potential. This condition will continue until a positive pulse is applied to the grid of tube 35, which will occur when the light spot reaches the first black area of the letter. The resulting pulse 47 will reverse the condition of conductivity and the output voltage at terminal 43 will rise to a relatively positive value due to the plate current in the cathode resistor of tube 35.

Subsequent positive pulses of the signal voltage d will have no further effect, since tube 35 is already conducting. The output voltage at terminal 43 (curve e) will therefore remain constant until the start of the second cycle, when the second positive pulse 49 of the differentiated control wave b will initiate a repetition of the previous cycle of operation. The output voltage of the upper envelope multivibrator 33 will therefore have the form of a square wave voltage e as shown in Fig. 2.

The output of the upper envelope multivibrator is differentiated by an upper envelope differentiator 51, the output of which will be as illustrated in curve f of Fig. 2. This differentiated voltage f is applied to one input terminal 57 of an upper envelope D. C. setter 53, the circuit diagram of which is shown in Fig. 6. The D. C. setter is a device commonly employed in television circuits for producing a D. C. output voltage whose amplitude is determined by the amplitude of a varying voltage at a particular instant of time. The varying voltage is the symmetrical sawtooth voltage c which is applied to input terminal 55, while the output voltage f of the upper envelope differentiator is applied to input terminal 57. The D. C. setter comprises four diode rectifiers 59, 61, 63 and 65. The input voltage is supplied between ground and the cathode of rectifier 59 and the anode of rectifier 61. Output is taken across a capacitor 67 which is connected between ground and output terminal 69, which terminal is also connected to the cathode of rectifier 63 and the anode of rectifier 65. The anodes of rectifier 59 and 63 are connected together, as are the cathodes of rectifiers 61 and 65. The input f from differentiator 51 is applied to the primary of transformer 71, the secondary of which is connected between the common anodes of rectifiers 59 and 63 and the common cathodes of rectifiers 61 and 65 through a parallel connected resistor and capacitor.

The positive pulses of the differentiated voltage f cause a current to flow from the secondary of transformer 71 through the series resistor and through two parallel paths, the first comprising rectifiers 59 and 61 and the second comprising rectifiers 63 and 65. As a result a negative bias potential is developed across the capacitor, which is sufficient to prevent the rectifiers from conducting current in the absence of a positive potential of greater amplitude applied to input terminal 57. Thus, after a short period of operation sufficient to build up such a bias voltage, there is an extremely high impedance between the input terminal 55 and the output terminal 69, since the anodes of the four rectifiers are at a negative potential with respect to their cathodes. However, at the instant a sufficiently large positive pulse f is applied to input terminal 57, the negative bias voltage is overcome and the rectifiers then present an extremely low impedance to the flow of current from the input terminal 55 to the output terminal 69. During this instant, therefore, capacitor 67 will become charged to a value depending upon the amplitude of the sawtooth voltage c which is applied to input terminal 55. The capacitor 67 will retain this voltage until a subsequent time when a successive positive pulse is again applied to input terminal 57. If, at the time such a subsequent pulse is applied, the amplitude of the sawtooth voltage has increased, the capacitor will charge to a higher value through rectifier 61, the resistor, transformer 71 and rectifier 63. If, however, at the time the subsequent pulse f arrives the amplitude of the sawtooth voltage c is less than it previously had been, then the capacitor 67 will discharge through rectifier 65, the resistor, the secondary of transformer 71 and rectifier 59. Thus, the output voltage of the upper envelope D. C. setter will be a D. C. voltage varying in amplitude in accordance with the time within each cycle of operation at which the positive differentiated pulse of voltage f is applied. This voltage is shown in curve g of Fig. 2.

In illustrating curve g, it has been assumed that prior to the cycle of operation illustrated the output voltage g was reduced to the relatively low value shown. Since in the case illustrated the top of the letter "E," of Fig. 4, is the same distance from the starting point in both cycles illustrated, there is no change in the amplitude of the D. C. control voltage g at the beginning of the second cycle of operation. Also, since the mirror is vibrating synchronously with the sawtooth voltage c, it will be appreciated that the amplitude of the D. C. control voltage g is a measure of the distance from the starting point 21 to the edge of the top of the letter. It should further be noted that the return path of the spot from point 23 to point 25 has no effect on the amplitude of voltage g. This is because the signal pulses occurring in the second half of the first cycle of operation have no effect, since the multivibrator voltage output e remains constant during this interval. Consequently, as the probe is moved slowly along the line of print, the amplitude of the D. C. voltage g is proportional to the contour of the top of the letter.

If desired, this D. C. voltage g may be used in any convenient manner to represent the contour of the letter or curve being scanned. In the particular case, where the device is to be used as a reading aid for the blind, it is preferred to convert the variable amplitude D. C. voltage into an audible tone whose frequency is proportional to the amplitude of the D. C. voltage and therefore proportional to the contour of the letter. This may be accomplished by applying the voltage g to an upper envelope low pass filter 73, which is simply a resistance-capacitance network, to smooth out the sudden variations in voltage which may be produced. The filtered voltage is then applied to the input of an upper envelope frequency modulated oscillator 75. This device may be of any conventional type, such as one employing a reactance tube or a saturable reactor to modulate the frequency of oscillation. The frequency range of oscillation preferably does not exceed one octave and may be of the order of from 1000 to 2000 cycles. However, it may have any convenient range of frequencies which are readily distinguishable. The output of the frequency modulated oscillator is then passed through a band pass filter 77 to remove any harmonic or distortion component frequencies and then applied to a mixer 79, if necessary, where it is combined with other voltages which may be developed in a manner to be described subsequently and then to output device 81, such as a loudspeaker or headset.

Reading aids to the blind which have been previously known have produced an output tone which varied cyclically in synchronism with the movement of the spot of light transversely across the characters. This tone was keyed on when the spot was on the letter, that is, on black, and was keyed off when the spot encountered a white area around the letter. An audible indication of the dimension of the letter at the point being scanned was thus produced in terms of the frequency range of the audible tone. The transverse scanning rate was conventionally from sixty up to several hundred cycles per second. As a result, the tone varied continuously in frequency at a rapid rate, even when the probe or scanner was held in a stationary position over the letter. Furthermore, the cyclic interruption of the tone created harmonic frequencies which made it difficult to identify the exact range of the tone. These facts made it very difficult to identify the character. In the present system, if the probe or scanner is held stationary over the letter, the output tone is a continuous note of a given frequency, containing no harmonics and therefore readily identified. As the probe is moved slowly along the printed line, in the present case, the audible tone varies slowly in frequency in accordance with the distance from the starting line to the top of the letter at the point being scanned, and thus the slowly varying frequency of the audible tone is a direct indication of the outline or contour of the top of the letter as the probe is moved along the line of characters.

While the system described so far has many uses, particularly in connection with the determination of the contour of a function curve in computers as discussed above, in its particular application to a reading aid for the blind, the identification of the characters can be improved by providing a simultaneous indication of the contour of the lower edge of the letters.

In accordance with the present invention, the lower contour is indicated by means of additional components substantially identical to those described above. However, in order to employ the return trace of the spot when it moves from point 23 to 25 in Fig. 4, for example, it is necessary to synchronize the operation of the lower envelope indicator with the second half of the scanning cycle. This is accomplished by reversing the polarity of the differentiated output wave $b$ produced by control wave differentiator 17 by means of a polarity reverser 83. This may be merely an amplifier tube, or the same function may be provided by reversing the output connections of the differentiator 17, if the output system is balanced with respect to ground. The wave of reversed polarity is illustrated in curve $br$ in Fig. 2. This voltage is applied to terminal 41 of the lower envelope multivibrator 85, the circuit diagram of which is the same as that illustrated in Fig. 5. The signal voltage $d$ is applied to the other input terminal 39 as in the preceding case. Thus the output voltage $h$ of Fig. 2 is similar to voltage $e$ except that the reversal occurs during the second half cycle of operation. This voltage is then differentiated by a device 87, which is similar to device 51, and applied to a lower envelope D. C. setter 89 which is identical to the upper envelope D. C. setter 53, the circuit diagram being as illustrated in Fig. 6. Curve $j$ of Fig. 2 therefore represents the D. C. voltage output of the device 89, and it will be observed that this voltage varies in amplitude as a function of the distance between the lower limit of the movement of the spot, the points 23, 29, etc., and the lower edge of the letter at the point in question. This voltage is then filtered by a lower envelope low pass filter 91 and applied to lower envelope frequency-modulated oscillator 93, the frequency range of which is preferably outside the range utilized for the upper envelope oscillator. For example, the lower envelope oscillator may be modulated from 100 to 200 cycles per second. This voltage may be passed through a suitable band pass filter 95 to the mixer 79 where its relative amplitude can be controlled as desired, and then to the output device 81.

Figure 3:
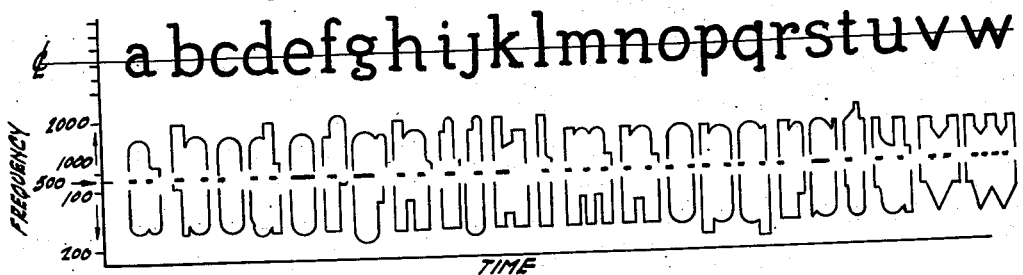
Figures 3 and 3a illustrate the contours of lower case and capital letters, respectively, showing the corresponding frequency variation produced by the device illustrated in Fig. 1.
Figure 3A:
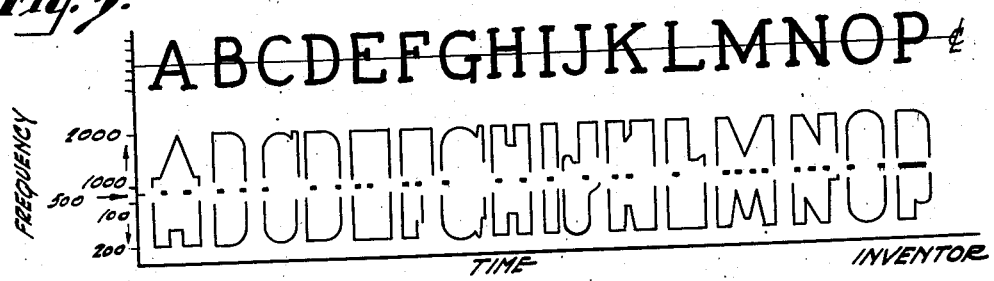

Referring now to Fig. 3, a number of the lower case letters of the alphabet have been illustrated, together with a chart showing the frequency of the output tones representative of the upper and lower contours of the letters. By observation it may be seen that most of the letters are clearly identifiable and thus the user will be able to recognize the different characters either directly in terms of the characteristic variations in frequency of the two tones, or by forming a mental image of the contour of the characters in accordance with the variations in the frequencies of the two tones as the probe is moved slowly across the line. In Fig. 3a, a number of capital letters have been illustrated in a similar manner to demonstrate that the upper and lower frequency contour provides adequate identification for the majority of the letters.

An exception may be noted in the case of lower case letters "c," "e" and "o," for example. If further identification of these letters is required, a further modification of this invention will now be described in which a third audible tone is produced which is keyed on only when part of a letter which occupies an area near the horizontal center line is encountered by the spot of light.

In order to accomplish the center line identification the saw tooth voltage $c$ is applied to a limiter or clipper 97 which may be of the type illustrated in Fig. 7. The sawtooth voltage is applied to an input terminal 99 and through a series limiting resistor 101 to the grid of tube 103. The cathode of this tube is connected to the cathode of a second tube 105 and both cathodes are grounded through a series resistor 107 and an adjustable bias source 109. The plate of tube 103 is connected to a suitable source of positive potential, while the plate of tube 105 is connected to the same source through a load resistor 111. The grid of tube 105 is connected to the ungrounded terminal of the bias source 109, while the plate of tube 105 is connected to the output terminal 113.

In the operation of this device, when the amplitude of the applied sawtooth voltage $c$ exceeds a predetermined positive value, the plate current flowing through resistor 107 will produce a positive voltage sufficient to bias off tube 105. The output voltage then is approximately equal to the applied plate voltage, and remains fixed at this value without regard to the amplitude of the input voltage. When the amplitude of the sawtooth voltage decreases below a predetermined value tube 103 will be cut off, the output tube 105 will draw a fixed current and the output voltage will drop to a value determined by the plate voltage and the resistance of the load resistor 111. The output voltage will remain at this value no matter how much greater the negative amplitude of the input voltage becomes. The purpose of the adjustable bias 109 is to set the operating point at approximately the mid-value of the sawtooth voltage as illustrated in curve $k$ of Fig. 2. If the sawtooth voltage is symmetrical with respect to ground this bias will not be required. However, if one terminal is grounded, as illustrated, it is necessary to raise the D. C. level of the clipper to a value approximately equal to the average value of the sawtooth wave.

The output voltage is then differentiated by a center line differentiator 115 to produce the voltage illustrated in curve *l* of Fig. 2. This square wave voltage occurs at a time corresponding to the center of the distance traversed by the spot. The voltage *l* is then applied to one input terminal 119 of a keyer 117, which may be of the type illustrated in Fig. 8. The keyer is simply a conventional tube of the mixed type commonly used in superheterodyne receivers having at least two grid electrodes adapted to independently control the conductivity of the tube. Input terminal 119 to which the voltage *l* is applied is connected to one grid while the other grid is connected to input terminal 121. Signal voltage *d* from the amplifier 19 is applied to input terminal 121. Output is taken across the cathode load resistor 123.

In the operation of this device an output voltage is produced only during the period when both grids are driven in a positive direction. Projecting the positive pulses of curve *d* on to curve *l*, it will be observed that curve *m* represents the output voltage during the first two cycles illustrated in Fig. 4. That is, when the spot crosses the center portion of the character "E," for example, a signal indicating a black area in this region is produced. This signal coincides in time with the center keying pulse of voltage *l* and therefore an output voltage is produced. During the second cycle of operation illustrated in Fig. 4, however, the spot misses the central portion 27 of the character "E" and it will be observed from the right hand portion of curve *m* that no signal is produced in this period. The pulse is therefore indicative of the existence of a portion of a character along the center line. The output of the keyer is applied to a peak detector 125, which may be of the type illustrated in Fig. 9. The voltage is applied to input terminal 127 which is coupled by capacitor 129 to the anode of a rectifier 131, the cathode of which is grounded. The anode is also connected to output terminal 133 and to a condenser 135 through a resistor 137.

In the operation of the peak detector the capacitor is charged to a voltage corresponding to the peak amplitude of the applied pulse. Thus if the probe is held stationary over the letter E so that the spot scans continuously the central portion 27, a continuous D. C. current is produced which is used to control the output of a keyed audio frequency oscillator 139. The frequency of this oscillator is constant, and may be any clearly distinguishable frequency, preferably not within the range of frequencies employed in the other oscillators and may be, for example, 500 cycles. Thus, as long as the spot continues to strike a central blank area a continuous 500 cycle tone is produced. However, when the probe moves to a position such that the spot does not encounter a black area in the central region of the character, the condenser 135 discharges. the output voltage of the peak detector drops to zero and the output of the keyed oscillator 139 is likewise reduced to zero. This audio frequency tone is also applied to mixer 79 and thus to the output device 81.

In Figs. 3 and 3*a*, the existence of a central black portion of each character is indicated by the discontinuous line passing through the center of the contour curves, and it may be observed that those characters which were previously identical as to their contours may now readily be identified.

What I claim is:

1. A device for producing an electrical signal corresponding to the contour of an indicium comprising means for cyclically moving a point source of energy transversely across said indicium and progressively in a direction normal to said transverse direction, energy responsive means for producing a signal voltage corresponding to the energy reflecting property of said indicium from point to point along the path of said point source, and means initiated concurrently with the start of the transverse movement of said point source and terminated by the first subsequent signal voltage for producing a control voltage whose amplitude is proportional to the distance between the starting point and the point at which said first subsequent signal voltage occurs.

2. A device of the character described in claim 1 which includes means for producing an output voltage whose frequency varies as a function of the amplitude of said control voltage.

3. A device for producing an electrical signal corresponding to the contour of an indicium comprising means for cyclically moving a point source of energy transversely across said indicium and progressively in a direction normal to said transverse direction, energy responsive means for producing a signal voltage corresponding to the energy reflecting property of said indicium from point to point along the path of said point source, means initiated concurrently with the start of the transverse movement of said point source in one direction for producing a first control voltage whose amplitude is proportional to the distance between the starting point in said one direction and the point at which said first subsequent signal voltage occurs, and means initiated concurrently with the start of the transverse movement of said point source in the other direction for producing a second control voltage whose amplitude is proportional to the distance between the starting point in said other direction and the point at which the next subsequent signal voltage occurs.

4. A device of the character described in claim 3 which includes, in addition, means for producing two output voltages whose frequencies vary in accordance with the amplitudes of said control voltages, respectively.

5. A device for producing an electrical signal corresponding to the contour of an indicium comprising means for cyclically moving a spot of light transversely across said indicium and progressively in a direction normal to said transverse direction, light responsive means for producing a signal voltage corresponding in amplitude to the amount of light reflected from said indicium from point to point along the path of said spot, a device having two conditions of stability for producing a square wave voltage, means for conditioning said device to one of said conditions concurrently with the start of the transverse movement of said spot in one direction, means for conditioning said device to the other of said conditions in response to the first subsequent change in amplitude of said signal voltage, and means controlled by said square wave voltage for producing a control voltage whose amplitude is proportional to the distance between the starting point of said spot and the point at which said first subsequent change in amplitude of said signal voltage occurs.

6. A reading device for producing an audible tone indicative of the contour of the letters of a line of print comprising means for cyclically scanning said line with a spot of light vibrating transversely across the line and adapted to be moved along the length of said line, and means responsive to changes in the intensity of the light reflected from said line for producing an audible tone whose frequency corresponds to the distance traversed by said spot from its starting point in a given direction to the first point of intersection with a letter.

7. A reading device for producing audible tones indicative of the contour of the letters of a line of print which comprises means for cyclically scanning said line with a spot of light vibrating transversely across the line and adapted to be moved along the length of said line, light responsive means for producing a signal voltage corresponding in amplitude to the amount of light reflected from said line at any point along the path of said spot, a device having two conditions of stability for producing a square wave voltage, means for conditioning said device to one of said conditions concurrently with the start of the transverse movement of said spot in one direction, means for conditioning said device to the other of said conditions in response to the first subsequent change in amplitude of said signal voltage, and means controlled by said square wave voltage for producing a control voltage whose amplitude is proportional to the distance between the starting point of said spot and the point at which said first subsequent change in amplitude of said signal voltage occurs.

8. A device of the character described in claim 7 which includes means for producing an audible tone and means for varying the frequency of said tone in accordance with the amplitude of said control voltage.

9. A reading device for producing audible tones indicative of the upper and lower contours of the letters of a line of print which comprises means for cyclically scanning said line with a spot of light vibrating transversely across the line and adapted to be moved along the length of said line, light responsive means for producing a signal voltage corresponding in amplitude to the amount of light reflected from said line at any point along the path of said spot, a pair of devices each having two conditions of stability for producing two square wave voltages, means for conditioning one of said devices to one of said conditions concurrently with the start of the transverse movement of said spot in one direction, and for conditioning said device to the other condition in response to the first subsequent change in amplitude of said signal voltage, means for conditioning the other of said devices to one of its conditions concurrently with the start of the transverse movement of said spot in the opposite direction and for conditioning said other device to its other condition in response to the first subsequent change in amplitude of said signal voltage, means controlled by said square wave voltages for producing two control voltages whose amplitudes are proportional, respectively, to the distances between said starting points and the point at which said first subsequent changes occur, and means for producing two audible tones whose frequencies vary in accordance with the amplitudes of said control voltages, respectively.

10. A device of the character described in claim 9 which includes, in addition, means for producing a third audible tone of constant frequency, and means for controlling the amplitude of said third tone in accordance with the intensity of light reflected from said line at a point midway between the limits of the lateral movement of said spot.

11. A reading device for producing an audible tone which varies in frequency as the device is moved along the line in accordance with the contour of the letters forming said line which includes means for cyclically scanning said line with a spot of light vibrating transversely across the line, light responsive means receptive to light reflected from the line of print for producing a signal voltage whose amplitude varies in accordance with the black and white area on which the spot falls at any instant, a multivibrator having two stable conditions of operation for producing a square wave voltage, means for producing a voltage pulse concurrent with the start of the transverse movement of said spot in a given direction, means for applying said pulse and said signal voltage to said multivibrator to control its condition of operation, means for deriving from said square wave voltage a pulse which coincides with the first change in amplitude of said signal voltage in each cycle of vibration of said spot, means under the control of said pulse for producing a D. C. voltage whose amplitude is proportional to the distance traversed by said spot up to the point where said first change in amplitude occurs, a source of audible frequency oscillations and means for controlling the frequency of said oscillations in accordance with the amplitude of said D. C. voltage.

ALDA V. BEDFORD.

No references cited.